United States Patent
Ravizza et al.

(10) Patent No.: US 11,120,150 B2
(45) Date of Patent: Sep. 14, 2021

(54) DYNAMIC ACCESS CONTROL FOR KNOWLEDGE GRAPH

(71) Applicant: International Business Machines Corporation, Armonk, NY (US)

(72) Inventors: Stefan Ravizza, Wallisellen (CH); Tim U. Scheideler, Schoenenberg (CH); Florian Graf, Niederhasli (CH); Andrea Giovannini, Zurich (CH); Frederik Flöther, Schlieren (CH); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/801,469

(22) Filed: Feb. 26, 2020

(65) Prior Publication Data
US 2020/0193038 A1    Jun. 18, 2020

Related U.S. Application Data (63) Continuation of application No. 15/894,975, filed on Feb. 13, 2018, now Pat. No. 10,621,368.

(51) Int. Cl.
*G06F 21/00* (2013.01)
*G06F 21/60* (2013.01)
(Continued)

(52) U.S. Cl.
CPC ........ *G06F 21/604* (2013.01); *G06F 16/9024* (2019.01); *G06F 21/6209* (2013.01);
(Continued)

(58) Field of Classification Search
None
See application file for complete search history.

(56) References Cited

U.S. PATENT DOCUMENTS 9,461,876 B2 * 10/2016 Van Dusen ............... G06N 5/02
2013/0073473 A1 * 3/2013 Heath ..................... G06Q 30/06
705/319
(Continued)

FOREIGN PATENT DOCUMENTS

CN      103562851 B    10/2016
EP      3086189 A2 ‡   10/2016  .............. B25J 11/00
(Continued)

OTHER PUBLICATIONS

Duan, Yucong et al. Specifying architecture of knowledge graph with data graph, information graph, knowledge graph and wisdom graph. 2017 IEEE 15th International Conference on Software Engineering Research, Management and Applications, https://ieeexplore.ieee.org/stamp/stamp.jsp?tp=&arnumber=7965747 (Year: 2017).*
(Continued)

*Primary Examiner* — Jeremiah L Avery
(74) *Attorney, Agent, or Firm* — Peter Edwards (57) ABSTRACT

A computer-implemented method, system, and computer program product for dynamic access control to a node in a knowledge graph includes: structuring nodes of a knowledge graph into a plurality of hierarchically organized graph layers; assigning, to one or more users, an access right to a first node of the knowledge graph, the access right to the node selected from a plurality of access rights, where different types of users have different access rights; and assigning, to at least one user from the one or more users, an additional access right to a second node of the knowledge graph.

20 Claims, 5 Drawing Sheets

(51) Int. Cl.
*G06F 21/62* (2013.01)
*G06N 5/02* (2006.01)
*G06K 9/62* (2006.01)
*G06F 16/901* (2019.01)

(52) U.S. Cl.
CPC ....... *G06F 21/6227* (2013.01); *G06K 9/6223* (2013.01); *G06N 5/02* (2013.01)

(56) References Cited

U.S. PATENT DOCUMENTS

| | | | | |
|---|---|---|---|---|
| 2015/0269383 | A1* | 9/2015 | Lang | H04L 63/20 726/1 |
| 2015/0347480 | A1‡ | 12/2015 | Smart | G06F 16/2237 707/74 |
| 2016/0189028 | A1‡ | 6/2016 | Hu | G06N 5/02 706/46 |
| 2016/0203327 | A1‡ | 7/2016 | Akkiraju | G06F 21/6218 707/78 |
| 2016/0350307 | A1‡ | 12/2016 | VerWeyst | H04L 63/101 |
| 2016/0352743 | A1‡ | 12/2016 | VerWeyst | G06F 21/6227 |
| 2016/0371288 | A1‡ | 12/2016 | Le Biannic | G06F 16/90324 |
| 2016/0371395 | A1‡ | 12/2016 | Dumant | G06F 16/24575 |
| 2016/0373423 | A1‡ | 12/2016 | Naibo | G06F 16/334 |
| 2016/0373456 | A1‡ | 12/2016 | Vermeulen | G06F 16/245 |
| 2017/0024375 | A1‡ | 1/2017 | Hakkani-Tur | G10L 15/1822 |
| 2017/0091590 | A1 | 3/2017 | Sawhney et al. | |
| 2017/0372043 | A1* | 12/2017 | Hurst | G06F 16/9024 |
| 2019/0065597 | A1* | 2/2019 | Murray | G06N 5/022 |
| 2019/0251272 | A1 | 8/2019 | Ravizza et al. | |

FOREIGN PATENT DOCUMENTS

| | | | | |
|---|---|---|---|---|
| EP | 3086189 A2 | 10/2016 | | |
| WO | 2015077708 A1 | 5/2015 | | |
| WO | WO-2015077708 A1 ‡ | 5/2015 | ......... | G06F 16/9024 |
| WO | 2016191069 A1 | 12/2016 | | |
| WO | 2016191070 A1 | 12/2016 | | |
| WO | 2016191081 A1 | 12/2016 | | |
| WO | WO-2016191069 A1 ‡ | 12/2016 | ............ | G06Q 10/10 |
| WO | WO-2016191070 A1 ‡ | 12/2016 | ......... | G06F 21/6227 |
| WO | WO-2016191081 A1 ‡ | 12/2016 | ............ | G06F 16/21 |
| WO | 2017100970 A1 | 6/2017 | | |
| WO | WO-2017100970 A1 ‡ | 6/2017 | .......... | G06F 16/904 |

OTHER PUBLICATIONS

Chen, Yongdang et al. Research on Data Mining Method Based on Access Information for Knowledge Management System. 2011 International Conference on Management and Service Science. https://ieeexplore.ieee.org/stamp/stamp.jsp?tp=&arnumber=5998753 (Year: 2011).*

Koo, Han-Seung et al. A tree key graph design scheme for hierarchical multi-group access control. IEEE Communications Letters vol. 13, Issue: 11. https://ieeexplore.ieee.org/stamp/stamp.jsp?tp=&arnumber=5337072 (Year: 2009).*

Xiao, Xiaochun et al. Extended Abstract: Access Graph Based Risk Analysis for Network Information System. 2008 International Conference on Security Technology, https://ieeexplore.ieee.org/stamp/stamp.jsp?tp=&arnumber=4725360 (Year: 2008).*

Galkin et al., "Enterprise Knowledge Graphs: A Backbone of Linked Enterprise Data," 2016 IEEE/WIC/ACM International Conference on Web Intelligence (WI), Oct. 13-16, 2016, 6 pages, DOI: 10.1109/WI.2016.82.‡

Tufekci, "Partitioning Graph Databases Via Access Patterns," Submitted to the Institute for Graduate Studies in Science and Engineering in partial fulfillment of the requirements for the degree of Master of Science, Date of Approval May 22, 2013, 66 pages.‡

Ravizza et al., "Dynamic Access Control for Knowledge Graph," U.S. Appl. No. 15/894,975, filed Feb. 13, 2018.

Chen et al., "Knowledge Discovery Technology Based on Access Information Mining on Knowledge Warehouse," IEEE, 2011 Eighth International Conference on Fuzzy Systems and Knowledge Discovery (FSKD), 2011, 4 pages.

Nickel et al., "A Review of Relational Machine Learning for Knowledge Graphs," Invited Paper, IEEE, vol. 104, No. 1, Jan. 2016, 23 pages.

Katal et al., "Authentication and Authorization: Domain Specific Role Based Access Control Using Ontology," IEEE , Proceedings of 7th International Conference on Intelligent Systems and Control, 2013, 6 pages.

List of IBM Applications or Patent Applications Treated as Related, Dated Feb. 24, 2020, 2 pages.

* cited by examiner
‡ imported from a related application

DYNAMIC ACCESS CONTROL FOR KNOWLEDGE GRAPH

BACKGROUND

The invention relates generally to a method for managing a knowledge graph and more specifically, to a method for dynamic access control to a node in a knowledge graph. The invention relates further to a related system for dynamic access control to a node in a knowledge graph, and a computer program product.

SUMMARY

The present invention provides a computer-implemented method, system, and computer program product for dynamic access control to a node in a knowledge graph. The method may include structuring nodes of a knowledge graph into a plurality of hierarchically organized graph layers. The method may also include assigning, to one or more users, an access right to a first node of the knowledge graph, the access right to the node selected from a plurality of access rights, where different types of users have different access rights. The method may also include assigning, to at least one user from the one or more users, an additional access right to a second node of the knowledge graph.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to knowledge graphs, and more specifically to managing a knowledge graph and dynamic access control to a node in a knowledge graph. While the present disclosure is not necessarily limited to such applications, various aspects of the disclosure may be appreciated through a discussion of various examples using this context.

In the context of this description, the following conventions, terms and/or expressions may be used:

The term 'knowledge graph' may denote a networked data structure including facts—represented in nodes—and edges—representing connections or links between the nodes. Thus, the knowledge graph may represent a knowledge base for an organization of so-called unstructured data, i.e., facts, and their semantic relationships. Knowledge graphs are often used by search engines.

The term 'hierarchically organized graph layers' may denote a knowledge graph allowing layers of different granularity for the information stored. The lowest layer of the knowledge graph may include all basic facts. These may be created individually by users. All higher levels of the knowledge graph represent summary nodes of a larger group of nodes of the next lower layer of the structured knowledge graph.

The term 'access rights' may denote the ability of a user to access information—in particular, the content of the node of a knowledge graph—in a determined way. A user may see a node, may actively access all portions of the content, may modify the content, and/or may modify links to other nodes with or without changing a way in factor for a respective link. In case no access right exists for a user to a certain node, that specific node may not be visible for inspection by a user or may not be accessed by a process of originating from the user (e.g., a search process of a search engine).

The term 'access history' may denote activities of a user in respect to a certain node in the past. The user may have access to a certain node or may not have access to the node, although the user may have had the right to access the node.

The term 'parameter of a user' may denote data in a profile of a user. The profile of the user may include an identification of the user but also data access histories, i.e., to which node of a knowledge graph the user may have had access rights and which the user may have executed.

The term 'condition outside the knowledge graph' may denote a link of a user via an information system to another user. Such an information system may e.g., be a social network platform or a directory of employees of an enterprise. Additionally, users of specialized electronic platforms—e.g., member system of any community—may define a condition outside the knowledge graph.

The term 'sub-graph' may denote a portion of a knowledge graph. The sub-graph may include nodes relating to each other. This way, such a sub-graph may be denoted as a domain in the knowledge graph.

The term 'highest access right' may denote a right of a user in respect to a node of a knowledge graph in which the user may have most options in dealing with the node. A lowest access right may be seen in the ability of the user to read a portion of the content of the knowledge graph. This may be only the name of the knowledge graph. Thus, the user may know that the node exists. Gradually, more rights may be assigned to the user: e.g., read larger parts of the node of the complete content of the node. The highest access right may denote the right to all the users to change the node, modify its edges, and also modify weighing factors (or distance factors) of the node.

The term 'node owner right' may denote the fact that a user has actively worked on a node by either creating the node or by editing the content or related links to it.

The term 'node active right' may denote that a user may actively have accessed the node the last time, i.e., in a pre-determined amount of time. This may allow the user to change existing nodes or add additional information by creating lower-level nodes.

The term 'node read right' may denote allowing a user to read a node, i.e., access parts of the content for the whole content. Other rights may not be included in the node read right.

The management of large data amounts, especially unstructured data, continues to be a challenge for enterprises. It continues to be difficult to store and manage expert skilled knowledge in a way that allows a quick and reliable access. The inequality of traditional solutions, such as relational database management systems for processing highly connected data, became obvious. Cognitive computing knowledge graphs, or graph databases, may be used to store and process information. A knowledge graph consists of facts which may be collected from various sources inside and outside the enterprises, which may be stored on the nodes of a mesh of the knowledge graph. The nodes are typically connected via edges, also known as links, representing the relationship between individual nodes. The knowledge graphs are able to handle up two billion of nodes and relationships in a single machine.

A success factor for the usability of the knowledge graph by a larger number of users is to manage access rights to different nodes of the knowledge graph. Different types of users may exist having different access rights, but also different needs to access the content of the knowledge graph. In parallel, commercial considerations may also play a role in restricting access to individual nodes. One solution to this dilemma may be to maintain a plurality of knowledge graphs relating to different sets of users. However, this may be a management intensive undergoing. An alternative solution to this may be to use access control lists (ACL) for the nodes. However, this approach may also be management intensive because every user/node combination must be thought about in advance and the content of the access control lists should be edited manually.

A disadvantage of known solutions may be the requirement to manage access control lists. As already mentioned, they represent a large work load burden to operators, which is growing the larger the knowledge graph gets. Hence, there may be a need to overcome traditional approaches to manage access rights to individual nodes of a knowledge graph which may not need to rely on access control lists. A more dynamic way of managing access rights seems to be a growing requirement for a consistent and automatic management of access rights to nodes in a knowledge graph.

According to one aspect of the present invention, a method for dynamic access control to a node in a knowledge graph may be provided. The method may include structuring nodes of the knowledge graph into a plurality of hierarchically organized graph layers, assigning, to a user, an access right selected out of a plurality of access rights to a node of the knowledge graph, and changing the access right to a node for a user dynamically depending on one selected out of a knowledge graph structure, an access history of a user to a node and a parameter of a user indicative of a condition outside the knowledge graph.

According to another aspect of the present invention, a system for dynamic access control to a node in a knowledge graph may be provided. The system may include a structuring module adapted for structuring nodes of the knowledge graph into a plurality of hierarchically organized graph layers, an access right assignment unit adapted for assigning to a user an access right selected out of a plurality of access rights to a node of the knowledge graph, and an access right changing module adapted for changing the access right to a node for a user dynamically depending on one selected out of a knowledge graph structure, an access history of a user to a node and a parameter of a user indicative of a condition outside the knowledge graph.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

In the following, additional embodiments of the proposed method—also applicable to the related system—will be described:

According to one additional embodiment of the method, all nodes of a sub-graph—in particular, content of facts stored in a related node—of the knowledge graph may be represented by a next higher graph layer node. Thus, elementary nodes of the knowledge graph may only be represented on the lowest level of the knowledge graph. All the higher layers—a plurality of higher layers may exist—may represent summary nodes representing a plurality of lower layer nodes. The nodes of the higher layers may be generated automatically or manually. Also, a mix of both approaches is possible. Nodes on higher layer levels may be linked to each other via edges, in a similar way as to how elementary nodes on the lowest layer of the knowledge graph may be connected.

According to one additional embodiment of the method, an access right for a user to the next higher graph layer may be determined by the highest access right to a node for the user in the represented lower-level sub-graph. Thus, assuming a hierarchy of access rights, a summary node of the next higher layer of the knowledge graph may have, for a particular user, the highest access right the user has on the lower layer level. Thus, a maximum access right propagation function may be applied to propagate access right for an individual user upwards the hierarchy levels of the layer structured knowledge graph. It may be noted that the access to individual nodes may be managed on a user level. Alternatively, the management of the access rights to the nodes may be managed on the node level. In every case it may be ensured that each users/node combination may have a dedicated access right. Also, role models are possible.

According to one additional embodiment of the method, an access right to a node may be selected out of the group including a 'node owner right', a 'node active right', and a 'node read right'. These rights may also be seen as statuses of a node in respect to an individual user. Additionally, another status of a node may be useful in managing access rights to knowledge graph nodes: the invisibility status. Nodes having this status in respect to a user are not visible at all for the user of the knowledge graph.

The node owner right may be indicative of the fact that a user has created the node. To such a node the creation user may have always access to read and modify the related node. The node active right may enable a user to modify the node and create lower level nodes. Thus, a user with such access rights may be equipped with the option to change and expand the knowledge graph with new nodes.

A user having a node read right may be enabled to read the content of the node. However, the user will not be able to modify the content. Additionally, the user may lose the node read right if the user did not actively access the related node over a longer period of time.

According to an additional embodiment of the method, each user of the knowledge graph may be granted at least node read rights for all nodes of a top layer of the knowledge graph. Thus, the user may understand the general context and content at a high level of the knowledge graph. Based on this, the user may decide to take further action to get access granted to lower level nodes. However, a commercial transaction may be required to allow a certain user access to the lower knowledge graph levels. It may also be noted that such an extended access to lower levels of the knowledge graph may also be limited in time, or limited to a number of accesses to lower level nodes.

According to another additional embodiment of the method, changing the access right to a node for a user dynamically, depending on one selected out of a knowledge graph structure, may include assigning access rights to a user to nodes lying in a predefined distance to a node to which the user has a node owner right or a node active right (access by radius). The distance may be defined by a distance function, e.g., by weights assigned to the links/edges of the knowledge graph. Hence, if no weight function may be applied—the distance may simply be measured in number of links—and intermediate nodes—between one and another node. Otherwise, (i.e., the weight concept is implemented) the accumulated (inverted) weight of the path from one node to another may be used as distance function.

Using the radius concept, the access to a node outside the radius may be restricted for the user. The restrictions may be implemented in one or more steps. For example, within an extended radius only nodes within a high-level knowledge graph accessible. In another example, within an extended radius only limited information of the nodes is accessible, e.g., node names or a summary of the nodes. In an example, within an extended radius only a summary graph derived from the original knowledge graph may be accessible. In an additional example, within an extended radius the information and count of potential detailed nodes of a visible high-level node cannot be retrieved. It may be noted that several radii may be defined with different parameters.

According to another additional embodiment of the method, the changing the access right to a node for a user dynamically, depending on a parameter of a user indicative of a condition outside the knowledge graph, may include assigning access rights to a user to nodes to which another user has access rights, if the user and the other user are linked in a social media network (access by peer network).

Examples of social media networks may include Skype, Sametime®, Xing, LinkedIn™, Facebook™, etc. Additional examples include company internal social media networks, or any other social media network. If a user may be connected to another user via such a social media network, some or all of the access rights may be transferable. The hierarchy of the knowledge graph level may be utilized. If only one person in the network may have access to a certain area of the knowledge graph, then only a high-level knowledge graph access may be granted. If more than one peer of a user in the social media network has access rights, then the access may be granted, to the user, to a lower level of the knowledge graph depending on the final implementation and the selected parameters.

A main driver behind such an approach may be that by participating in a learning course for a new topic, it may make sense to connect—via the social media network—with a trainer, or other participants, to get access to the course related parts of the knowledge graph. Another example could also be a mentee/mentor relationship. This would mean that a user may get access rights to parts of the knowledge graph; e.g.: studying reasons through the trusted 1:1 relationship between the mentor and the mentee.

According to a further additional embodiment of the method, the changing the access right to a node for a user dynamically, depending on a parameter of a user indicative of a condition outside the knowledge graph, may include assigning access rights to a user to nodes to which another user of a same cluster of users of a group of users has access rights (access by peer cluster). The same cluster may be determined by applying unsupervised machine learning using data about the user, access rights to nodes, access rights to higher level nodes, and activities regarding the node—in particular accessing the node. The social media network may be a private network related to an enterprise or a selected group of enterprises (supporting customers and/or supply-chain partners), other organized predefined groups, or open, public social media networks.

The unsupervised machine learning approach may, for example, use a k-means algorithm. The algorithm, or model, may be based on the information of each user—in particular one's user profile, the access rights to relevant nodes or areas of nodes (e.g., nodes on a higher level of the knowledge graph), and the activity related to the nodes (e.g., read, modify, create, delete, ignore).

This way, nodes with provided access to most of the users within the cluster (e.g., based on a set of thresholds) may be propagated to all users within this cluster. An example may include independent individual software developers in a large enterprise who would all be interested to view information on latest internal software releases. By determining the type of an employee (and determining him as developer) the employee may be granted similar permissions (i.e., access rights) as like employees. It may be noted that this sub-method does not require a direct social media network connection between the peers.

According to an additional embodiment of the method, changing the access right to a node for a user dynamically, depending on a parameter of a user indicative of a condition outside the knowledge graph, may include assigning access rights, to a user, to nodes to which a group of other users has access rights (access by trend analysis). The group may be determined by supervised machine learning. The users of the group may have comparable access histories to nodes.

To implement this sub-method, it may be analyzed which nodes may be trendy and may be accessed by a lot of users within a short amount of time. As a consequence, hot topics may be more accelerated within a given community. For each trendy node (or area), a supervised machine learning approach may be performed (e.g., based on a neural network, a decision tree approach, logistic regression, or alike). The concept is to find other users which are 'similar' in their access behavior if compared to other users which already have access to the node (or area).

As in the unsupervised machine learning approach, the underlying model may be based on the information of the user, the access rights to each node (or area), and the activity level regarding the nodes. After training the system, the related algorithm may score each user who does not already have access to the node in question (or area). The "false positive" are users who may not have access to the node (or area), but are similar to such other users and hence, the algorithm may suggest that these users are interested in this access right. These nodes (or area) may be set to visible to the related users. An example would be topics around a new technology (e.g., "Blockchain") which was not widely spread a few years ago, but became a hyped topic recently. Some employees may have built up knowledge in the knowledge graph before, but it was not accessed or shared enterprise-wide. All the knowledge around "Blockchain" could be released for access by salespeople—for example, in order for them to have customer conversations.

According to an additional embodiment of the method, changing the access right to a node for a user dynamically, depending on an access history of a user to a node, may include changing the node active right to the node read right if a user did not access the node for a predetermined period of time. This would be a counter-reaction to a proliferation of access rights to too many users. If such a counter-reaction would not exist, sooner or later all users might have access to all nodes in the knowledge graph. Hence, the parameter predetermined period of time would become a critical element in balancing access rights to nodes in the knowledge graph.

According to a permissive embodiment of the method, the changing the access right to a node for a user dynamically, depending on an access history of a user to a node, may include removing the node read right if a user did not access one of the next lower level nodes for a predefined period of time. This way, a proliferation of access rights to nodes may also be counter-fought.

The proposed method for dynamic access control to a node in a knowledge graph may offer multiple advantages and technical effects:

Operators may no longer be forced to manually manage access control lists. This may be a pretty time-consuming and thus costly effort. In contrast, the access of users to nodes of the knowledge graph may be managed by the structure of the knowledge graph itself. Thus, the method and the related system may represent a set of organizing a knowledge graph in the sense of maintaining access rights to nodes in a variable way. Different conditions may be used to set power meters of the access right self-management, like initial access right of a small number of users, the selection of an appropriate social media network, the time span in which users may lose access rights if they are not actively using the knowledge graph, and accessing individual nodes.

An additional access right method may be applied in addition to the proposed system such that a mixed approach for the whole knowledge graph, e.g., only parts—in particular sub-graphs—may be applied. This way, a default access right management may be implemented for a knowledge graph. Additionally, more advanced rules for access rights to individual users for certain knowledge graph nodes (or carriers of the knowledge graph) may be implemented.

The various sub-methods proposed may allow a variety of different implementations and embodiments of the here proposed general concept. In particular, the different sub-methods may be combined to build a complete self-management instrument for access rights to nodes of the knowledge graph. The access to individual nodes and the capabilities of the user in respect to the node may also be influenced by external parameters, like a membership to a group of users. Access histories of users to nodes of varying interests of the user may be captured and stored over time to determine a current appropriate access right to a selection of nodes, such that the user may not be overwhelmed by the sheer amount of facts stored in nodes of the knowledge graph.

Certain topics stored as facts in certain areas—in particular sub-graphs—of the knowledge graph may be promoted to individual user groups.

This way, a completely dynamic—in time and across user communities—access right management may be implemented without the need for an operator to care for the internal and external parameters. It may also be possible to allow an access to the next layer of the hierarchically organized knowledge graph only if certain conditions are met (e.g., if an additional payment for information access has been made). Additionally, a membership to certain groups—in particular to a company or a group of companies—may be reflected.

In the following, a detailed description of the figures will be given. All instructions in the figures are schematic.

Figure 1:
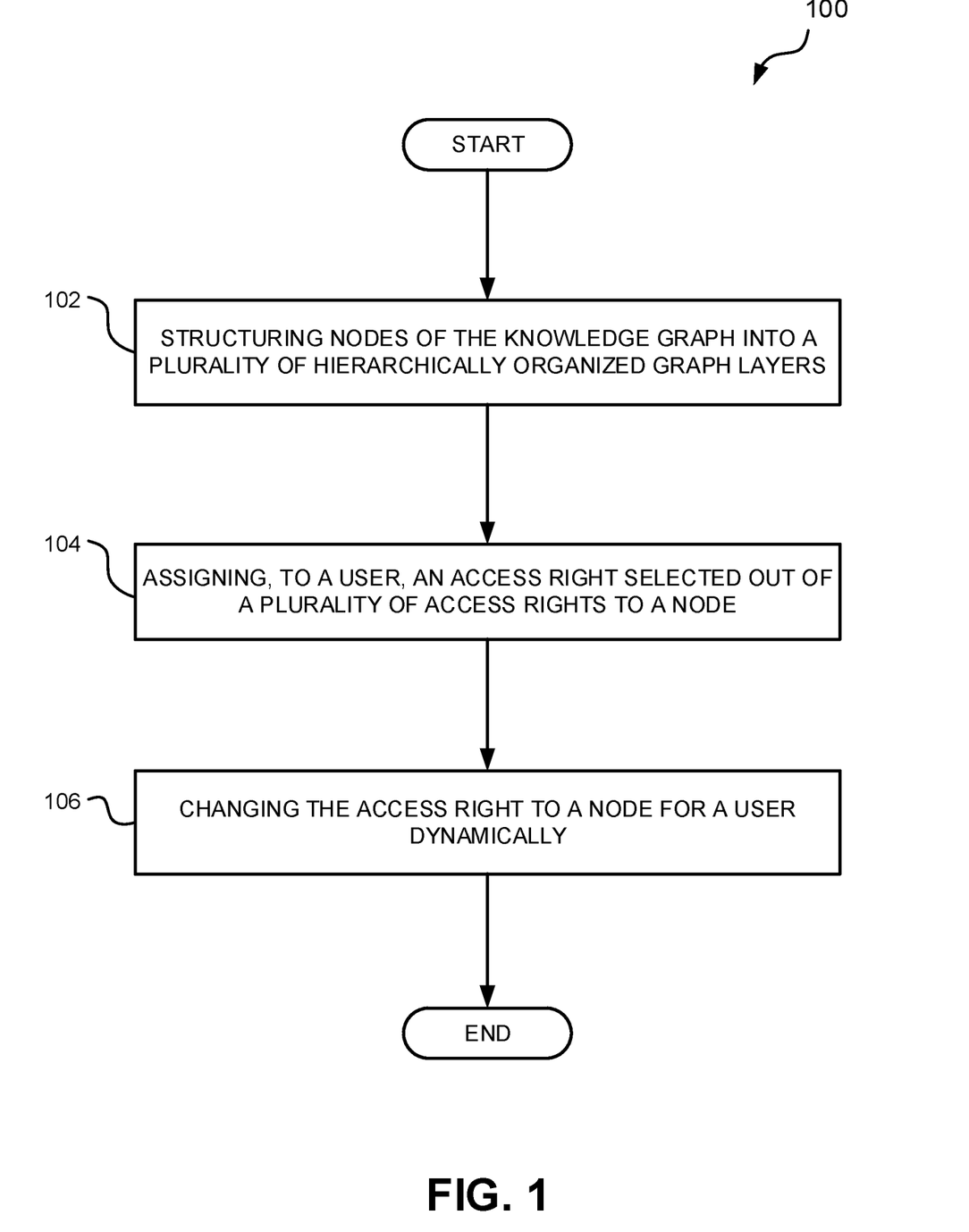
FIG. 1 depicts a flow diagram of an embodiment of the inventive method for dynamic access control to a node in a knowledge graph, according to various embodiments.

Referring now to FIG. 1, a block diagram of an embodiment of a method 100 for dynamic access control to a node in a knowledge graph is depicted, according to various embodiments. The method 100 may include operation 102 of structuring nodes of the knowledge graph into a plurality of hierarchically organized graph layers, and operation 104 of assigning, to a user, an access right selected out of a plurality of access rights to a node of the knowledge graph. Each user may be represented by his respective user profile including data and/or metadata about the user, one of the metadata being an access right to a specific node in the knowledge graph. The access rights may allow the user to view, read, modify and create a node of the knowledge graph.

Additionally, the method 100 may include operation 106 of changing the access right to a node for a user dynamically. The change of an access right to users may be based according to a fixed schedule, which may have regular or irregular time periods. The time periods may be predetermined or they may be determined on dynamically changing parameters (e.g., number of users, growth rate of users, number of nodes, growth rate of nodes, or any other externally triggered event).

The change of an access right may depend on a structure of the knowledge graph, an access history of a user to a node, and/or a parameter of a user—in particular his profile—indicative of a condition outside the knowledge graph.

Figure 2:
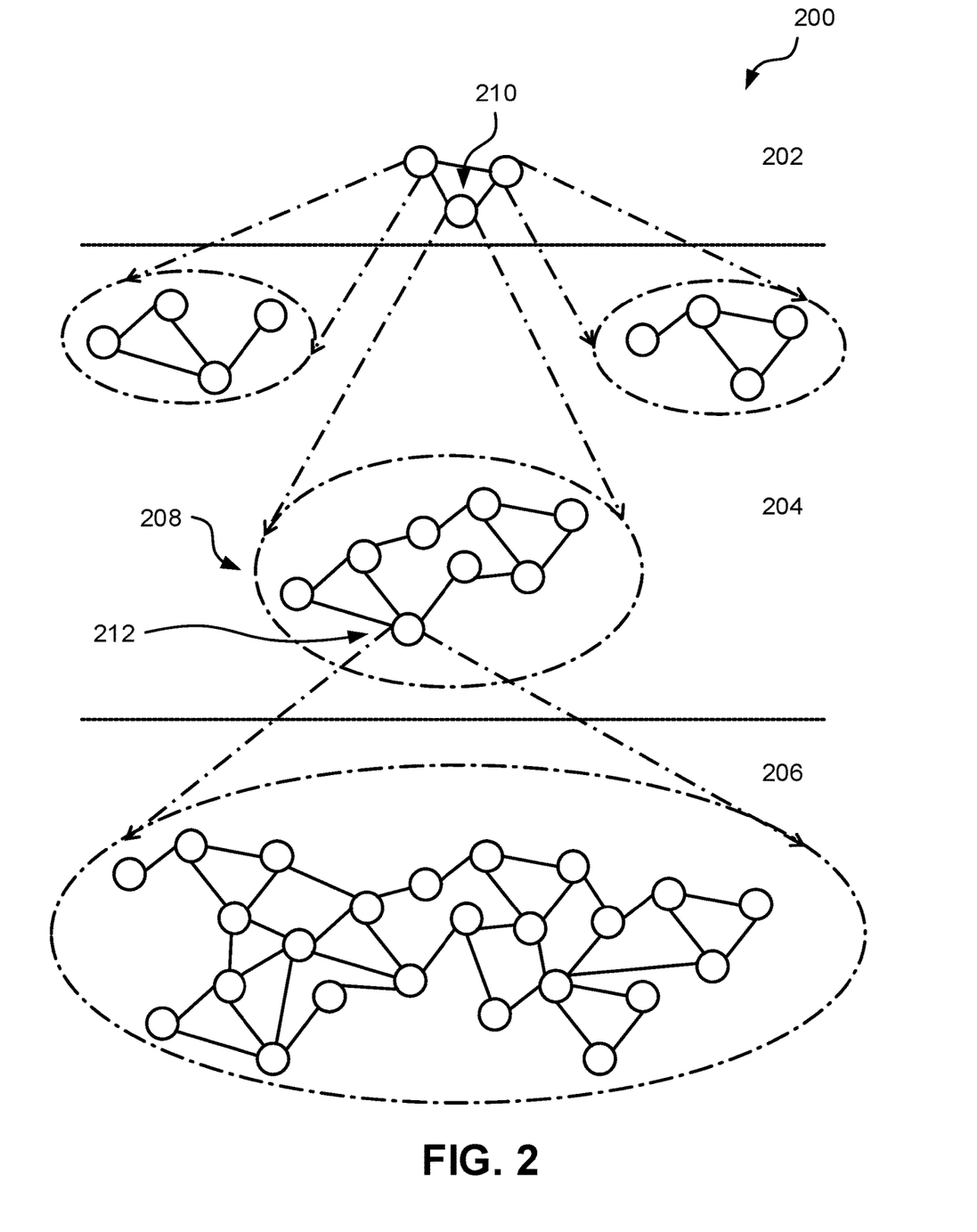
FIG. 2 depicts a block diagram of an embodiment of a portion of a hierarchically organized knowledge graph, according to various embodiments.

Referring to FIG. 2, a block diagram of an embodiment of a portion of a hierarchically organized knowledge graph 200 is depicted, according to various embodiments. The knowledge graph 200 is organized in 4 layers. The nodes of top layer L2 202 may be accessible by every user (i.e., every user has at least the right to view or read each node on the top layer L2). Thus, the user has the node read right.

The lowest level L0 206 (i.e., the fact level in which all nodes include elementary facts) may represent a traditional knowledge graph, in which nodes are connected via links or edges, potentially with an integrated distance functions via weights of the edges.

The shown middle layer L1 204 includes certain groups—in particular sub-graphs—and is circled with an ellipse, of which each ellipse may represent certain topic areas. As can be seen, each sub-graph may be represented by one node in the next higher level layer. For example, node 210 represents the sub-graph 208. The node 212 of sub-graph 208 represents an area, or a portion, of the lowest layer L0 206 of the complete knowledge graph. This way, elementary facts are all stored on the lowest layer 206 of the knowledge graph 200. The upper layers L1 204 and L2 202 include only summary nodes of the lower layer levels.

If the knowledge graph is structured in such a hierarchically organized way, all the methods to manage access rights discussed may easily be applied, in particular the node owner right, the node active right, and the node read right.

If none of these rights may be granted to a user, the respective node may be invisible for the user.

The sub-methods applicable include the access by radius, the access by peer network, the access by peer clustering, and the access by trend analysis. These different access methods and a change between the different access rights have been discussed further herein. Additionally, the automatic and dynamic change of access rights can easily be implemented.

It may be understood that the main idea of such a layout structured knowledge graph is that every user can see the highest level of the knowledge graph and can only access lower levels of the knowledge graph if the user fulfills certain criteria which are dynamically assigned. Depending on the required degree of abstraction for permissions (i.e., access rights), a predefined number of layers can be defined for the knowledge graph. The here proposed method and system do not limit the number of layers, however, for practical matters the number of layers may be between three and six. This global setting of levels for a knowledge graph can be increased throughout the lifecycle of a knowledge graph in order to reflect a growing number of nodes on the lowest level.

Figure 3:
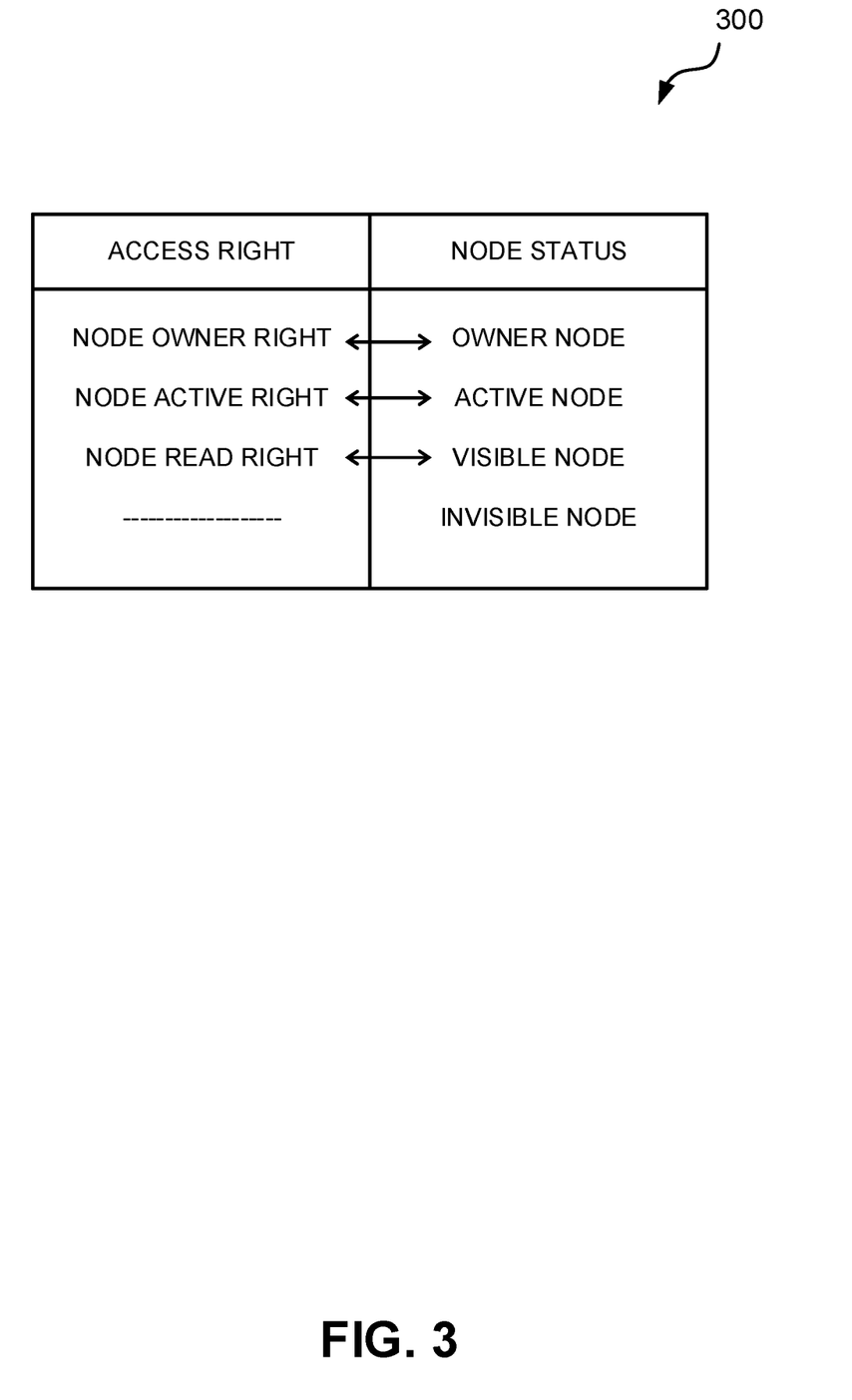
FIG. 3 depicts a block diagram of an embodiment of a table of access right to nodes compared to statuses of nodes in the knowledge graph, according to various embodiments.

Referring to FIG. 3, a block diagram of an embodiment of a table 300 of access right to nodes compared to statuses of nodes in the knowledge graph is depicted, according to various embodiments. The left side of the table shows access rights which may be granted to a user for accessing a specific node in the knowledge graph. Such an access right may be applicable to every layer of the structured knowledge graph.

On the right side of the table, a status of a node is shown. The node may be owned (i.e., owner node)—in the sense of "he has created the node"—by a user. If the user has created the node, he may have also edited the content and/or related links to it. This access right is always granted to the creator of the node and cannot be revoked.

Alternatively, the node may be denoted as active node. In this instance, a user has actively accessed the node in a recent, predetermined time. This allows the user to change the node or add additional information by creating lower-level nodes.

Again, alternatively, a node may be a visible node. In this instance, a user has access to the node but has not used his right to access the note. In general, the different methods discussed assign or remove this access right to users.

A final status, to which no access right exists, is the invisible node. Users having no access right consequently do not see the respective node, but only aggregated information in a node on a higher level of the knowledge graph which can be accessed.

Furthermore, conventional access rights can be granted for different user roles to protect certain areas of the knowledge graph or to make them visible to every user. A mixture of the here proposed dynamic access right management and a static conventional access management (e.g., by manually managed access control lists) can be implemented.

It may also be noted that the most effective dynamic management of access rights to nodes of a knowledge graph may be achieved if the different sub-methods may be implemented together.

Figure 4:
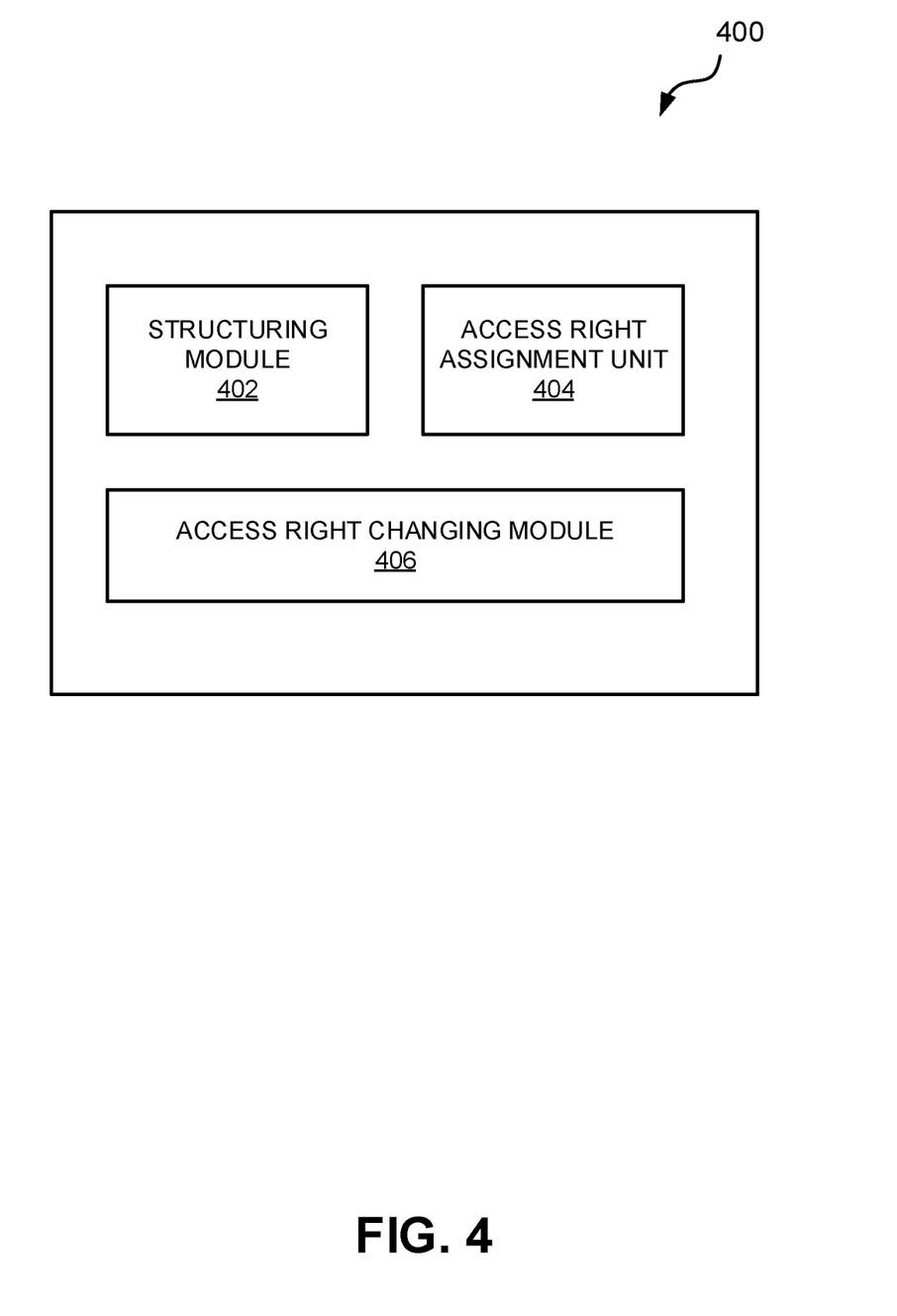
FIG. 4 depicts an embodiment of the inventive system for dynamic access control to a node in a knowledge graph, according to various embodiments.

Referring to FIG. 4, an embodiment of an inventive system 400 for dynamic access control to a node in a knowledge graph is depicted, according to various embodiments. The system 400 includes a structuring module 402 adapted for structuring nodes of the knowledge graph into a plurality of hierarchically organized graph layers, an access right assignment unit 404 adapted for assigning to a user an access right selected out of a plurality of access rights to a node of the knowledge graph, and an access right changing module 406 adapted for changing the access right to a node for a user dynamically, depending on one selected out of a knowledge graph structure, an access history of a user to a node, and a parameter of a user indicative of a condition outside the knowledge graph.

Figure 5:
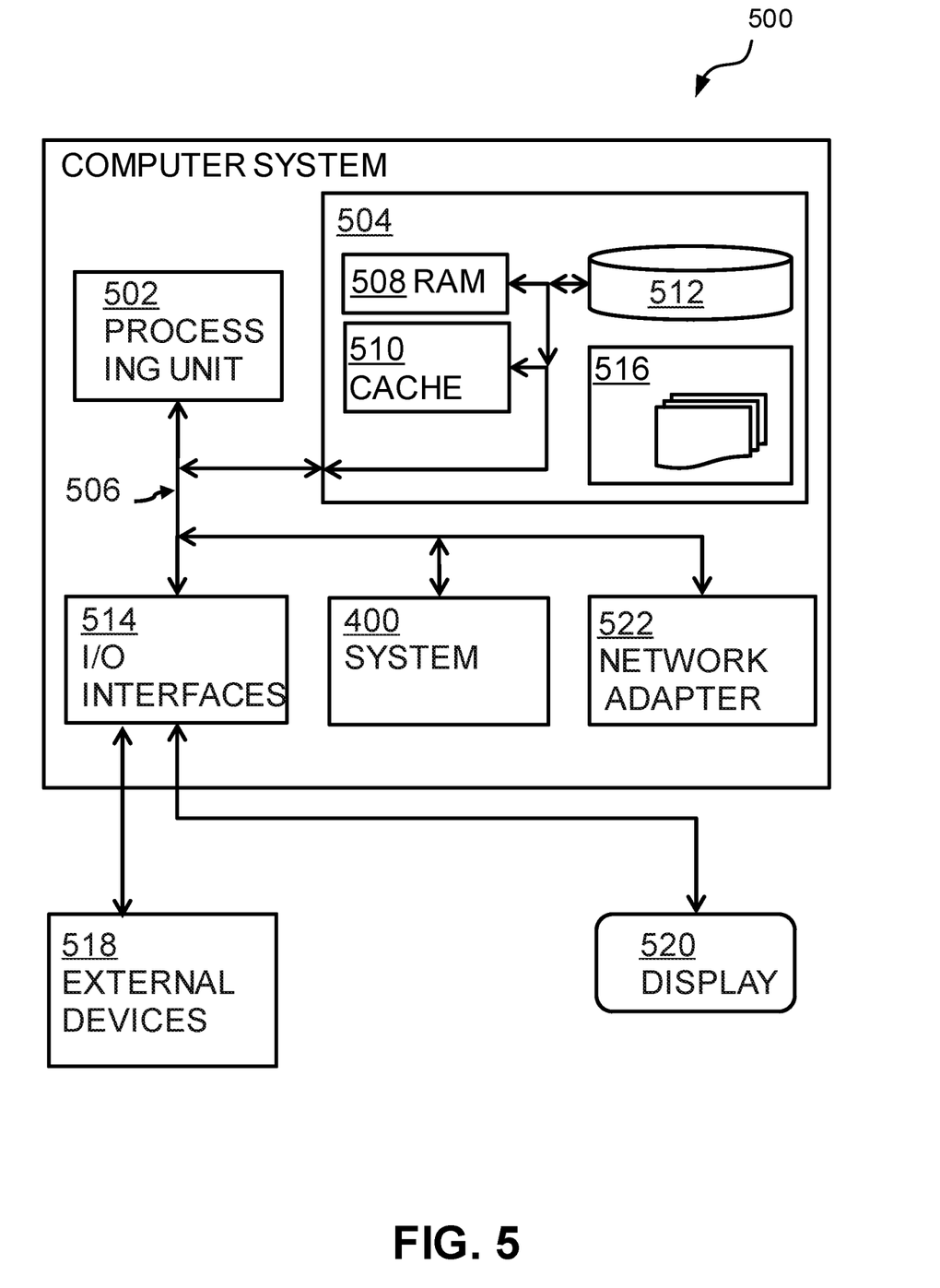
FIG. 5 depicts a sample computer system, according to various embodiments.

Referring to FIG. 5, a sample computer system 500 suitable for executing program code related to the proposed method is depicted, according to various embodiments. Embodiments of the invention may be implemented together with virtually any type of computer, regardless of the platform being suitable for storing and/or executing program code. Computer system 500 is just one example computer system that may be used to implement embodiments of the invention.

The computing system 500 is only one example of a suitable computer system and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, system 400 for dynamic access control to a node in a knowledge graph may be attached to the bus system 506. In some embodiments, system 400 may be the same system 400 depicted in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    structuring nodes of a knowledge graph into a plurality of hierarchically organized graph layers;
    assigning, to one or more users, an access right to a first node of the knowledge graph, the access right to the node selected from a plurality of access rights, wherein different types of users have different access rights; and
    assigning, to at least one user from the one or more users, an additional access right to a second node of the knowledge graph.

2. The method of claim 1, wherein the plurality of access rights comprises:
    a node owner right, wherein the node owner right indicates that the user has created the node;
    a node active right, the node active right enabling the user to modify the node and create lower level nodes; and
    a node read right, the node read right enabling the user to read content of the node.

3. The method of claim 2, wherein assigning, to the one or more users, the access right to the first node of the knowledge graph comprises:
    assigning at least a node read right to all users of the knowledge graph for the first node of the knowledge graph, wherein the first node of the knowledge graph includes nodes of a top layer of the knowledge graph.

4. The method of claim 3, wherein assigning, to the at least one user from the one or more users, the additional access right to the second node of the knowledge graph comprises:
    assigning at least a node active right to the at least one user that has accessed the second node of the knowledge graph within a pre-determined amount of time, wherein the second node of the knowledge graph includes nodes of a middle layer of the knowledge graph.

5. The method of claim 1, further comprising:
    changing the accesses right to at least the first node dynamically, the changing based on at least one of a structure of the knowledge graph, an access history of a user to the node, and a parameter of the user indicative of a condition outside the knowledge graph.

6. The method of claim 5, wherein the changing the access right to at least the first node dynamically, based on at least the parameter of the user indicative of the condition outside the knowledge graph comprises:
    assigning, to a user, access rights to nodes to which a second user has access rights, if the user and the second user are linked in a social media network.

7. The method of claim 5, wherein the changing the access right to at least the first node dynamically, based on at least the parameter of the user indicative of the condition outside the knowledge graph comprises:
    assigning, to the user, access rights to nodes to which a second user of a same cluster of users of a group of users has access rights,
    wherein the same cluster is determined by applying unsupervised machine learning using at least one of data about the user, access rights to nodes, access rights to higher level nodes, and activities regarding the node.

8. The method of claim 7, wherein the cluster building is performed by applying a k-means method to user profile data.

9. The method of claim 5, wherein the changing the access right to at least the first node dynamically, based on at least the parameter of the user indicative of the condition outside the knowledge graph comprises:
    assigning, to the user, access rights to nodes to which a group of other users, not including the user, has access rights, wherein the group is determined by supervised machine learning and wherein the other users of the group have comparable access histories to nodes.

10. The method of claim 5, wherein changing the access right to at least the first node dynamically, based on at least the access history of the user to the node comprises:
changing the access right to the second node from a node active right to a node read right if the user did not access the node for a predetermined period of time.

11. The method of claim 5, wherein changing the access right to at least the first node dynamically, based on at least the access history of the user to the node comprises:
removing a node read right if the user did not access one of the lower level nodes for a predefined period of time.

12. A system having one or more computer processors, the system configured to:
structure nodes of a knowledge graph into a plurality of hierarchically organized graph layers;
assign, to one or more users, an access right to a first node of the knowledge graph, the access right to the node selected from a plurality of access rights, wherein different types of users have different access rights; and
assign, to at least one user from the one or more users, an additional access right to a second node of the knowledge graph.

13. The system of claim 12, wherein the plurality of access rights comprises:
a node owner right, wherein the node owner right indicates that the user has created the node;
a node active right, the node active right enabling the user to modify the node and create lower level nodes; and
a node read right, the node read right enabling the user to read content of the node.

14. The system of claim 13, wherein assigning, to the one or more users, the access right to the first node of the knowledge graph comprises:
assigning at least a node read right to all users of the knowledge graph for the first node of the knowledge graph, wherein the first node of the knowledge graph includes nodes of a top layer of the knowledge graph.

15. The system of claim 14, wherein assigning, to the at least one user from the one or more users, the additional access right to the second node of the knowledge graph comprises:
assigning at least a node active right to the at least one user that has accessed the second node of the knowledge graph within a pre-determined amount of time, wherein the second node of the knowledge graph includes nodes of a middle layer of the knowledge graph.

16. The system of claim 12, further configured to:
change the accesses right to at least the first node dynamically, the changing based on at least one of a structure of the knowledge graph, an access history of a user to the node, and a parameter of the user indicative of a condition outside the knowledge graph.

17. A computer program product comprising a non-transitory computer readable storage medium having program instructions embodied therewith, the program instructions executable by a processor on a computing device to cause the computing device to perform a method comprising:
structuring nodes of a knowledge graph into a plurality of hierarchically organized graph layers;
assigning, to one or more users, an access right to a first node of the knowledge graph, the access right to the node selected from a plurality of access rights, wherein different types of users have different access rights; and
assigning, to at least one user from the one or more users, an additional access right to a second node of the knowledge graph.

18. The computer program product of claim 17, wherein the plurality of access rights comprises:
a node owner right, wherein the node owner right indicates that the user has created the node;
a node active right, the node active right enabling the user to modify the node and create lower level nodes; and
a node read right, the node read right enabling the user to read content of the node.

19. The computer program product of claim 18, wherein assigning, to the one or more users, the access right to the first node of the knowledge graph comprises:
assigning at least a node read right to all users of the knowledge graph for the first node of the knowledge graph, wherein the first node of the knowledge graph includes nodes of a top layer of the knowledge graph.

20. The computer program product of claim 19, wherein assigning, to the at least one user from the one or more users, the additional access right to the second node of the knowledge graph comprises:
assigning at least a node active right to the at least one user that has accessed the second node of the knowledge graph within a pre-determined amount of time, wherein the second node of the knowledge graph includes nodes of a middle layer of the knowledge graph.

* * * * *